(12) United States Patent
Zhang

(10) Patent No.: US 12,547,840 B2
(45) Date of Patent: Feb. 10, 2026

(54) MULTI-STAGE PROCESSING FOR LARGE LANGUAGE MODEL TO ANSWER MATH QUESTIONS MORE ACCURATELY

(71) Applicant: Microsoft Technology Licensing, LLC, Redmond, WA (US)

(72) Inventor: Yu Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 323 days.

(21) Appl. No.: 18/311,150

(22) Filed: May 2, 2023

(65) Prior Publication Data
US 2024/0370658 A1    Nov. 7, 2024

(51) Int. Cl.
G06F 40/35       (2020.01)
G06F 40/242      (2020.01)

(52) U.S. Cl.
CPC ............ *G06F 40/35* (2020.01); *G06F 40/242* (2020.01)

(58) Field of Classification Search
CPC ...................................................... G06F 40/35
See application file for complete search history.

(56) References Cited

U.S. PATENT DOCUMENTS

| | | | |
|---|---|---|---|
| 2016/0378853 A1* | 12/2016 | Mohammad | G06F 16/3344 707/706 |
| 2018/0196797 A1* | 7/2018 | Mansour | G06F 40/226 |
| 2023/0394328 A1* | 12/2023 | Wei | G06N 5/022 |
| 2024/0354319 A1* | 10/2024 | Dinu | G06F 16/3329 |

* cited by examiner

Primary Examiner — Pierre Louis Desir
Assistant Examiner — Kristen Michelle Masters
(74) Attorney, Agent, or Firm — ArentFox Schiff LLP

(57) ABSTRACT

Example implementations include a method, apparatus, and computer-readable medium configured for receiving, at an interface between a user and a large language model, an original natural language prompt including a plurality of facts from the user. The implementations further include generating a series of contextual sub-questions based on the original natural language prompt using the large language model. Additionally, the implementations further include providing the contextual sub-questions to the large language model to obtain contextual answers. Additionally, the implementations further include applying the contextual sub-questions against the original natural language prompt with the contextual answers as a refined natural language prompt to the large language model in a reverse order of the series. Additionally, the implementations further include outputting, to the user, a final answer from the large language model to a terminal state of the refined natural language prompt.

15 Claims, 8 Drawing Sheets

MULTI-STAGE PROCESSING FOR LARGE LANGUAGE MODEL TO ANSWER MATH QUESTIONS MORE ACCURATELY

BACKGROUND

Large Language Model (LLM) is a term that refers to artificial intelligence or machine-learning models that can generate natural language texts from large amounts of data. Large language models use deep neural networks, such as transformers, to learn from billions or trillions of words, and to produce texts on any topic or domain. Large language models can also perform various natural language tasks, such as classification, summarization, translation, generation, and dialogue.

One known issue with LLMs is accuracy. For example, the domain of a LLM may not include a specific factual answer. In some cases, the LLM may assemble a coherent answer, but a fact stated in the answer may be incorrect. Such errors may be referred to as hallucinations. Another example is questions related to arithmetic reasoning. For instance, an LLM may not correctly compare amounts in different units, or may not answer the question asked. In view of the foregoing, there is a need to improve accuracy of LLMs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of answering a natural language prompt using a large language model, including: receiving, at an interface between a user and a large language model, an original natural language prompt including a plurality of facts from the user; generating a series of contextual sub-questions based on the original natural language prompt using the large language model; providing the contextual sub-questions to the large language model to obtain contextual answers; applying the contextual sub-questions against the original natural language prompt with the contextual answers as a refined natural language prompt to the large language model in a reverse order of the series; and outputting, to the user, a final answer from the large language model to a terminal state of the refined natural language prompt.

In some aspects, the techniques described herein relate to an apparatus including: a memory; and a processor coupled with the memory and configured to: receive, at an interface between a user and a large language model, an original natural language prompt including a plurality of facts from the user; generate a series of contextual sub-questions based on the original natural language prompt using the large language model; provide the contextual sub-questions to the large language model to obtain contextual answers; apply the contextual sub-questions against the original natural language prompt with the contextual answers as a refined natural language prompt to the large language model in a reverse order of the series; and output, to the user, a final answer from the large language model to a terminal state of the refined natural language prompt.

In some aspects, the techniques described herein relate to a non-transitory computer-readable medium having computer-executable instructions stored thereon that when executed by a computer processor cause the computer processor to: receive, at an interface between a user and a large language model, an original natural language prompt including a plurality of facts from the user; generate a series of contextual sub-questions based on the original natural language prompt using the large language model; provide the contextual sub-questions to the large language model to obtain contextual answers; apply the contextual sub-questions against the original natural language prompt with the contextual answers as a refined natural language prompt to the large language model in a reverse order of the series; and output, to the user, a final answer from the large language model to a terminal state of the refined natural language prompt.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
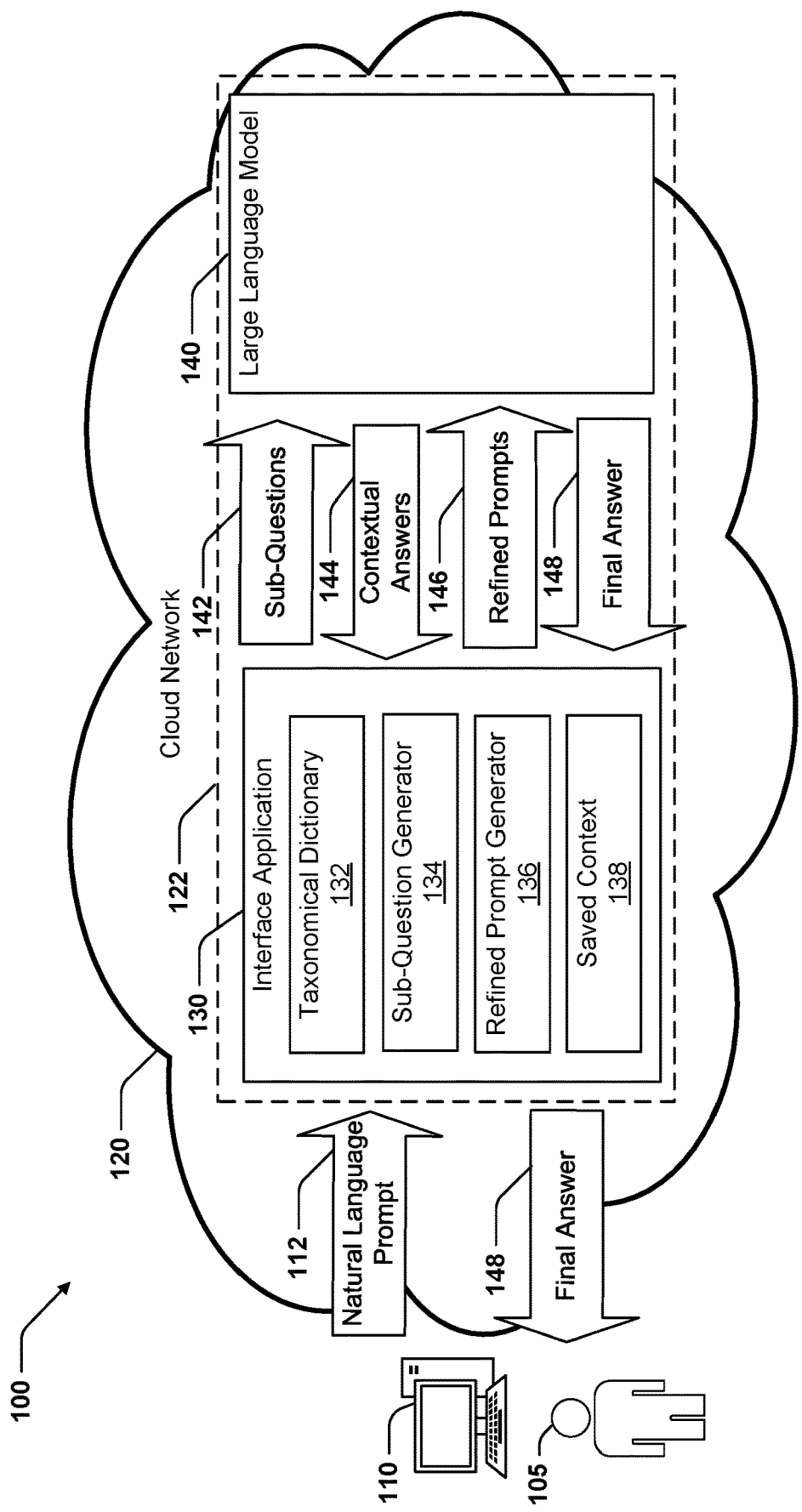
FIG. 1 is a diagram of an example of an architecture for a system to interface a large language model to a user, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to multi-stage processing for a large language model to answer math questions more accurately. A large language model may not correctly analyze a natural language prompt that includes a request for arithmetic reasoning. For example, it has been noted that LLMs struggle with arithmetic reasoning involving different units. Other potential problems may relate to order of events and numerical relationships among textual terms.

One potential use for LLMs would be to compare multiple options and provide a recommendation to a user. The technical difficulties of mathematical reasoning by a LLM, however, pose the risk that the LLM provides an inaccurate answer to such requests. Further, in the context of a recommendation, a user may not have the complete information that the LLM is evaluating and may not be able to spot even obvious errors.

In an aspect, the present disclosure provides techniques for an interface between a user and a large language model to use multiple queries to refine a natural language prompt from the user before returning a final answer to the user. For example, the interface may be a search engine, chat bot, recommendation engine, or other application that receives a natural language prompt from a user. The natural language prompt may include a plurality of facts, either directly, or by reference. For example, the prompt may explicitly state a constraint such as a limit or budget. In some implementations, the prompt may include options or refer to source from which options may be derived. For instance, a request to compare service plans may refer to website or database with numerical facts about the service plans.

In some implementations, the interface may perform multi-stage processing of natural language prompts in response to detecting that the natural language prompt includes arithmetic reasoning. For example, the interface may include or access a taxonomical dictionary of the large language model and identify numerical values, mathematical operations and/or comparisons.

The multi-stage processing of a natural language query includes generating a series of contextual sub-questions using the large language model, receiving contextual answers to the sub-questions, and refining the original natural language prompt based on the contextual sub-questions and contextual answers. In particular, the contextual sub-questions and contextual answers may be applied to the original natural language prompt in a reverse order such that the added context improves the accuracy of higher level sub-questions until a terminal state of the natural language prompt is reached. The large language model is then able to answer the terminal state of the natural language prompt with greater accuracy due to the additional context provided by the contextual sub-questions and contextual answers.

Implementations of the present disclosure may realize one or more of the following technical effects. The use of recursive sub-questions applied to a large language model to determine the context of a math problem may improve the accuracy of answers to math problems. For instance, the accuracy may be evaluated using manual review or automated review, for example, based on a set of labeled prompts. As another example, the use of the large language model itself to understand semantic meaning of math questions expands the scope of natural language prompts that can be answered correctly by a large language model. For example, recommendations based on comparison of numerical values may be provided.

Turning now to FIGS. 1-8, examples are depicted with reference to one or more components and one or more methods that may perform the actions or operations described herein, where components and/or actions/operations in dashed line may be optional. Although the operations described below in FIGS. 4-7 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a conceptual diagram 100 of an example of an architecture for a system 120 to interface a large language model 140 to a user 105. The system 120 may be, for example, a cloud network including computing resources that are controlled by a network operator and accessible to public clients such as a user device 110 operated by the user 105. For example, the system 120 may include a plurality of datacenters 122 that include computing resources such as computer memory and processors. In some implementations, the datacenters 122 may host a compute service that provides computing nodes on computing resources located in the datacenter. The computing nodes may be containerized execution environments with allocated computing resources. For example, the computing nodes may be virtual machines (VMs), process-isolated containers, or kernel-isolated containers. The nodes may be instantiated at a datacenter 122 and imaged with software (e.g., operating system and applications for a service). The system 120 may include edge routers that connect the datacenters 122 to external networks such as internet service providers (ISPs) or other autonomous systems (ASes) that form the Internet.

The system 120 may provide a large language model (LLM) 140 that is configured to receive a natural language prompt and output a response. The LLM 140 may be a specific instance or version of a LLM artificial intelligence that has been trained and fine-tuned on a large corpus of text. The LLM may be a Generalized Pre-trained Transformer (GPT) model. For example, a GPT model may include millions or billions of parameters trained on vast amounts of data (e.g., gigabytes or terabytes of text). A GPT model is a type of neural network that uses a transformer architecture to learn from large amounts of text data. The model has two main components: an encoder and a decoder. The encoder processes the input text and converts it into a sequence of vectors, called embeddings, that represent the meaning and context of each word. The decoder generates the output text by predicting the next word in the sequence, based on the embeddings and the previous words. The model uses a technique called attention to focus on the most relevant parts of the input and output texts, and to capture long-range dependencies and relationships between words. The model is trained by using a large corpus of texts as both the input and the output, and by minimizing the difference between the predicted and the actual words. The model can then be fine-tuned or adapted to specific tasks or domains, by using smaller and more specialized datasets.

The LLM 140 may provide an application programming interface (API) that allows other applications to interact with the LLM 140. For example, the API may allow a user or application to provide a prompt to the LLM 140. Prompts are the inputs or queries that a user or a program gives to an LLM AI, in order to elicit a specific response from the model. Prompts can be natural language sentences or questions, or code snippets or commands, or any combination of text or code, depending on the domain and the task. Prompts can also be nested or chained, meaning that the output of one prompt can be used as the input of another prompt, creating more complex and dynamic interactions with the model.

The interface application 130 may be an application that interfaces between the LLM 140 and user 105. For example, the interface application 130 may provide a graphical user interface on the user device 110 for the user 105. The interface application 130 may receive a natural language prompt 112 from the user 105. The interface application 130 may supplement or revise the natural language prompt 112 in order to improve the accuracy of an answer from the LLM 140 and/or tailor the natural language prompt 112 for a particular scenario. As an example, the interface application 130 may be a chat application that stores previous prompts, answers, and context within a session. The stored information for a session may be used to supplement additional natural language prompts 112 from the user 105. As another example, the interface application 130 may be a recommendation engine that supplements the natural language prompt 112 with external data. Similarly, the interface application 130 may store previous prompts, answers, and context to improve the natural language prompts 112.

In an aspect, the interface application 130 is configured to refine a natural language prompt that is related to arithmetic reasoning. Such arithmetic reasoning, also referred to as math problems or math questions, has demonstrated technical challenges for LLMs to generate a correct answer. By refining the natural language prompt, the interface application 130 may improve the likelihood that the LLM 140 will generate a final answer that correctly answers the natural language prompt 112. The operation of the interface application 130 may be transparent to the user 105. For example, the interface application 130 may present the final answer 148 to the user 105 without presenting any intermediate prompts or answers.

In some implementations, the interface application 130 includes a taxonomical dictionary 132 that defines a vocabulary related to arithmetic reasoning. The interface application 130 may utilize the taxonomical dictionary 132 to determine whether the natural language prompt 112 includes a question related to arithmetic reasoning. For example, the taxonomical dictionary 132 may be generated by the LLM 140 and stored for external access, for example, at the interface application 130. In some implementations, the interface application 130 may use an API call or prompt to the LLM 140 determine whether the natural language prompt 112 includes a question related to arithmetic reasoning based on the taxonomical dictionary 132. For instance, a question related to arithmetic reasoning may include at least numerical values and an operation or comparison according to the taxonomical dictionary 132.

The interface application 130 includes a sub-question generator 134 configured to generate a series of contextual sub-questions 142 based on the original natural language prompt 112 using the LLM 140. The sub-questions may be questions about the natural language prompt 112 or a previous sub-question. The sub-question generator 134 is configured to provide the contextual sub-questions 142 to the LLM 140 to obtain contextual answers 144. The sub-question generator 134 may generate sub-questions until reaching a terminal state. The sequence of the sub-questions may depend on output from the LLM 140 (e.g., contextual answers 144) and may not be fixed. The sub-question generator 134 may use the taxonomical dictionary 132 which contains set of semantic wording to process math problems, such as goal, action, subject, and object. If each sub-question can be resolved to the terminal state, then the sub-question generator 134 proceeds to the next sequence of wording. If a sub-question cannot be resolved to a terminal state, then the sub-question generator 134 may keep processing this sub-question until the sub-question reaches terminal state.

The taxonomical dictionary 132 may include a set of semantic keywords to determine if a result of a sub-question is at terminal state. In some implementations, each semantic wording may be associated with a terminal state. For example, for a sub-question processed for "goal," the sub-question generator may ask "if result is comprised of single goal?" If the answer is no, then the subsequent action would break this result to further sub-questions until a result indicates a single goal. In some implementations, the further sub-questions may be generated using a chain of semantic keywords in the taxonomical dictionary. Each semantic keyword is chained with subsequent semantic keywords or questions. The chain may include conditions to determine whether to continue the chain or repeat steps. For example, a chain starting with the "goal" semantic keyword may be: Goal→Determine if resolved result is single goal→ if not, break to sub questions with each goal→get action→compare goals→get goal met operator→repeat step until it reach state of single goal. Accordingly, the chain for the semantic keyword "goal" may identify one or more goals in the natural language prompt 112.

The interface application 130 includes a refined prompt generator 136 configured to apply the contextual sub-questions 142 against the original natural language prompt 112 with the contextual answers 144 as a refined natural language prompt 146 to the LLM 140 in a reverse order of the series of sub-questions 142. The refined prompt generator 136 may provide the refined prompts 146 to the LLM 140. The refined prompt generator 136 may store contextual answers 144 to the refined prompts 146 as a saved context 138. In some implementations, the sub-question generator 134 and the refined prompt generator 136 may be implemented recursively. For instance, the sub-question generator 134 may call the sub-question generator 134 for a further sub-question and/or the refined prompt generator 134 when a contextual answer is received. In some implementations, the sub-question generator 134 may add sub-questions to a stack, and the refined prompt generator 134 may process answers to generate a refined prompt, and remove the sub-questions from the stack. The refined prompt generator 136 may reach a terminal state of the refined natural language prompt when all of the contextual sub-questions have been applied. The refined prompt generator 136 may apply the terminal state of the refined natural language prompt to the LLM 140 and receive a final answer 148. The refined prompt generator 136 may return the final answer 148 to the user device 110.

Figure 2:
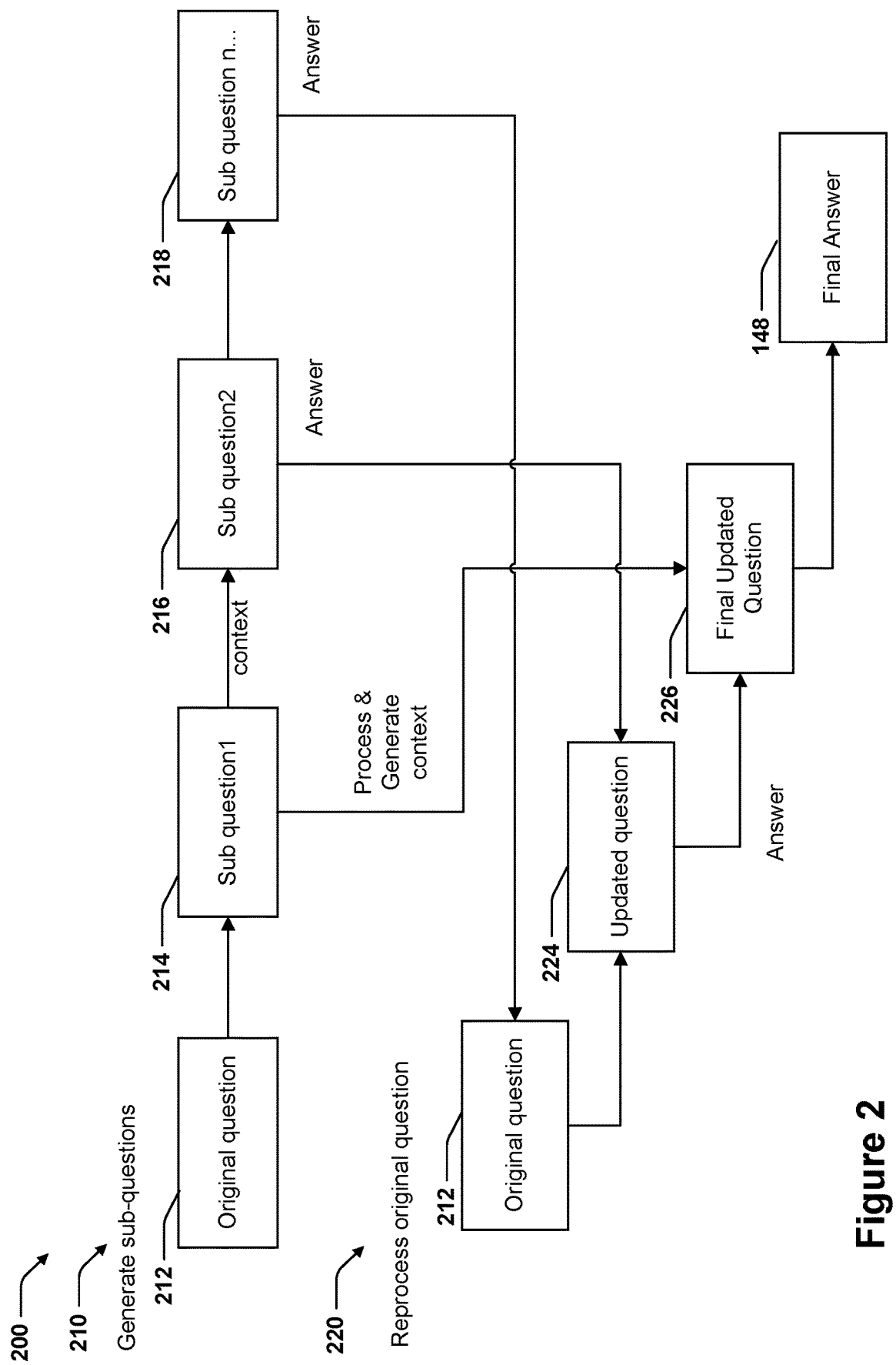
FIG. 2 is a conceptual diagram of an example technique for refining a natural language prompt, in accordance with aspects described herein.

FIG. 2 is a conceptual diagram 200 of an example technique for refining a natural language prompt 112. For example, the natural language prompt 112 may be a math question, which may be referred to as the original question 212. As an example, the original question 212 may ask for a best choice out of several different options, which may be in different units. As an example, the original question 212 may be: "I have $200 every month, suggest best pricing options from following options: a. $100 every month; b. $500 per year; c. $500 every month." This question may pose problems for a LLM 140 because the options are in different units. Further, a human reader would understand the context of the question, whereas the LLM 140 is trained based on relationships among tokens (e.g., words). In this case, the LLM 140 may place less relevance on option b because the different unit is less similar to budget than the other options due to use of per year rather than per month. Accordingly, the LLM 140 may not select the mathematically correct option.

In a first phase 210, the interface application 130 may generate sub-questions. As discussed above, the sub-question generator 134 may generate a sub-question using the taxonomical dictionary 132 of the LLM 140. For example, the sub-question generator 134 may generate a first sub-question 214. In an example, the first sub-question 214 may ask what is the goal of the original question 212. The sub-question generator 134 may provide the first sub-question 214 to the LLM 140 to process and generate context (e.g., contextual answers 144. In some implementations, depending on the taxonomical dictionary 132 and the contextual answer 144, the sub-question generator 134 may generate additional sub-questions to the first sub-question 214 until the sub-question generator 134 reaches a terminal state for the first sub-question 214. In this example, the goal may be to determine the best price with a limit of $200 per month.

The sub-question generator 134 may generate a second sub-question 216 based on the contextual answer 144 to the first sub-question. For instance, in some implementations, the second sub-question may ask about an action of the original question 212 with respect to a goal. For example, an action of a math question may be comparing or performing an operation such as addition, subtraction, multiplication, or division. The sub-question generator 134 may provide the second sub-question 216 to the LLM 140 and receive another contextual answer 144. In this example, the action may be comparing. Once again, depending on the answer to the second sub-question 216, the sub-question generator 134 may generate further sub-questions from the second sub-question 216 until reaching a terminal state defined for the second sub-question 216 by the taxonomical dictionary 132.

The sub-question generator 134 may continue generating additional sub-questions 218 based on the taxonomical dictionary 132 and the contextual answers 144. For example, in some implementations, if the LLM 140 indicates that the action is comparison, a third sub-question may ask about a subject of the action. In the example question, the subject may be the $200 per month limit. In some implementations, a fourth sub-question may ask about an object of the action. In the example question, the object may be each of the options.

Once the sub-question generator 134 has reached a terminal state of the sub-questions based on the taxonomical dictionary 132, a second phase 220 may include reprocessing the original question 212 using the contextual answers. In particular, the sub-questions may be applied to the original question 212 in a reverse order. For example, the answer to the last sub-question 218 (e.g., what is the object?) may be applied to the original question 212. For instance, in the example question, the context of the last sub-question may be the three options: a. $100 every month; b. $500 per year; c. $500 every month, which may be saved to the saved context 138. The refined prompt generator 136 may add this context to the original question 212. The refined prompt generator 136 may next refine the updated question 224 based on the third sub-question. Accordingly, the updated question 224 may ask what the common pattern between the subject and the object is. In the example question, the common pattern is frequency. The refined prompt generator 136 may further update the updated question 224 based on the context of the second sub-question 216 question (e.g., comparison). The refined prompt generator 136 may next ask what the frequency of the object is. In the example question, the frequency of the object is monthly. The refined prompt generator 136 may then ask the LLM 140 to convert the options to a monthly frequency such that option b becomes $41.67 per month, while options a and c remain unchanged. The refined prompt generator 136 may then further update the updated question 224 with the converted options. Accordingly, the final updated question 226 may be: "I have $200 every month, suggest best pricing options from following options: a. $100 every month; b. $41.67 per month; c. $500 every month." The refined prompt generator 136 may provide the final updated question 226 to the LLM 140 and receive the final answer 148. In some implementations, the final answer 148 may correspond to a recommendation. For example, the interface application may recommend option b as the best pricing option.

Figure 3:
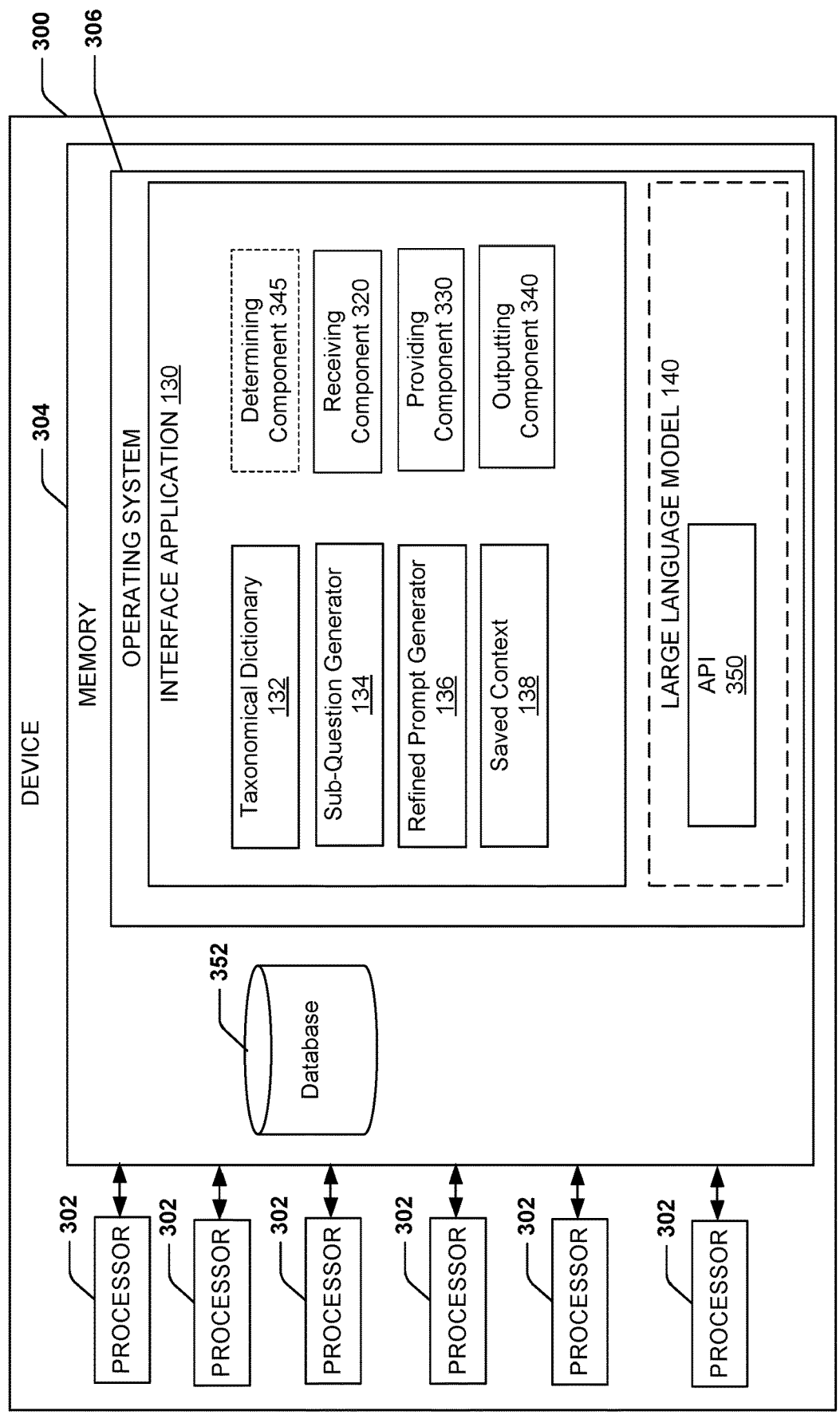
FIG. 3 is a schematic diagram of an example of a device for an interface to refine natural language prompts related to arithmetic reasoning, in accordance with aspects described herein.

FIG. 3 is a schematic diagram of an example of an apparatus 300 (e.g., a computing device) for interfacing a user device 110 to a large language model 140. The apparatus 300 may be implemented as one or more computing devices in the system 120.

In an example, the apparatus 300 includes at least one processor 302 and a memory 304 configured to execute or store instructions or other parameters related to providing an operating system 306, which can execute one or more applications or processes, such as, but not limited to, the interface application 130. For example, processors 302 and memory 304 may be separate components communicatively coupled by a bus (e.g., on a motherboard or other portion of a computing device, on an integrated circuit, such as a system on a chip (SoC), etc.), components integrated within one another (e.g., a processor 302 can include the memory 304 as an on-board component), and/or the like. Memory 304 may store instructions, parameters, data structures, etc. for use/execution by processor 302 to perform functions described herein. In some implementations, the memory 304 includes the database 352 for use by the interface application 130. In some implementations, the apparatus 300 includes the LLM 140, for example, as another application executing on the processors 302. Alternatively, the LLM 140 may be executed on a different device that may be accessed via an API 350.

In an example, the interface application 130 includes the taxonomical dictionary 132, sub-question generator 134, refined prompt generator 136, and/or saved context 138 discussed above with respect to FIG. 1. The interface application 130 may further include a receiving component 320 configured to receive, at the interface between the user 105 and the LLM 140, an original natural language prompt 112 including a plurality of facts from the user. For instance, the receiving component 320 may implement a user interface such as a web page or web application that receives input from the user 105. The interface application 130 may further include a providing component 330 configured to provide the contextual sub-questions 142 to the LLM 140 to obtain contextual answers 144. For instance, the providing component 330 may make calls to an API of the LLM 140. The interface application 130 may further include an outputting component 340 configured to outputting, to the user, a final answer from the large language model to a terminal state of the refined natural language prompt. For instance, the outputting component 340 may output the final answer 148 to the user interface generated by the receiving component 320.

In some implementations, the interface application 130 may optionally include a determining component 345 configured to determine based on semantic assessment using the taxonomical dictionary 132 of the LLM 140 that the original natural language prompt 112 includes a question related to arithmetic reasoning.

In some implementations, the apparatus 300 is implemented as a distributed processing system, for example, with multiple processors 302 and memories 304 distributed across physical systems such as servers, virtual machines, or datacenters 122. For example, one or more of the components of the interface application 130 may be implemented as services executing at different datacenters 122. The services may communicate via an API.

Figure 4:
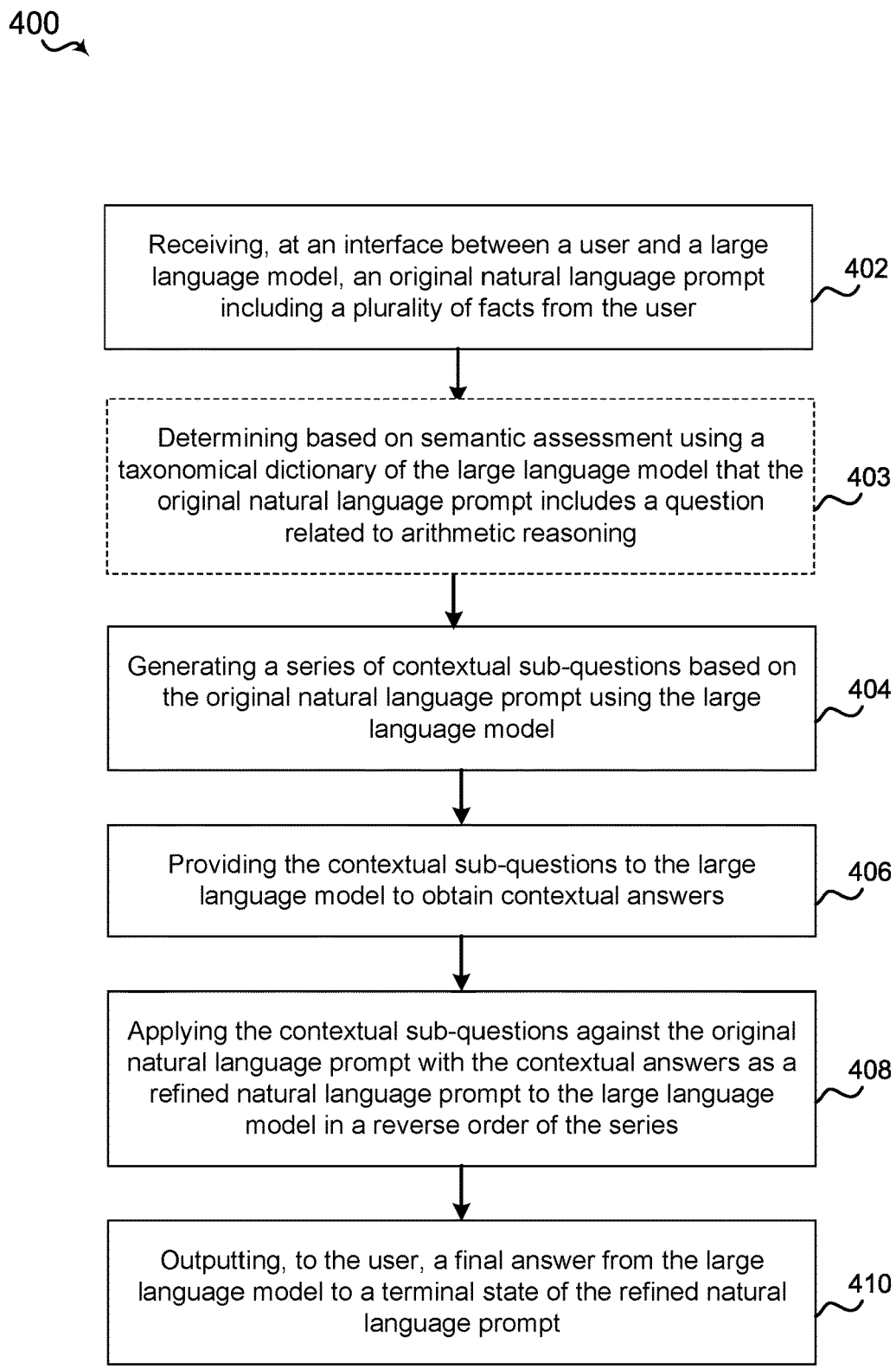
FIG. 4 is a flow diagram of an example method of refining a natural language question, in accordance with aspects described herein.

FIG. 4 is a flow diagram of an example of a method 400 for answering a natural language prompt using a large language model. For example, the method 400 can be performed by the interface application 130, the apparatus 300 and/or one or more components thereof to answer natural language prompts 112 using the LLM 140.

At block 402, the method 400 includes receiving, at an interface between a user and a large language model, an original natural language prompt including a plurality of facts from the user. For example, in an aspect, apparatus 300, processor 302, memory 304, interface application 130, and/or receiving component 320 may be configured to or may comprise means for receiving, at an interface between a user and a large language model, an original natural language prompt including a plurality of facts from the user. For example, the receiving at block 402 may include providing a user interface (e.g., website or application) to the user and receiving a packet (e.g., an IP packet) including the original natural language prompt 112. Further, for example, the receiving at block 402 may provide a simplified interface to the LLM 140 that transparently improves the natural language prompt 112.

Referring to an alternative or additional aspect, at block 403, the method 400 may further include determining based on semantic assessment using a taxonomical dictionary of the large language model that the original natural language prompt includes a question related to arithmetic reasoning. For example, in an aspect, apparatus 300, processor 302, memory 304, interface application 130, and/or determining component 345 may be configured to or may comprise means for determining based on semantic assessment using a taxonomical dictionary 132 of the large language model 140 that the original natural language prompt 112 includes a question related to arithmetic reasoning. For example, the determining component 345 may compare each word in the natural language prompt to the taxonomical dictionary 132. In some implementations, the original natural language prompt may be considered related to arithmetic reasoning when the natural language prompt 112 includes at least numerical values and an operation or comparison according to the taxonomical dictionary. Further, for example, the determining at block 502 may be performed because math questions or prompts related to arithmetic reasoning are a known technical problem for large language models. By identifying such prompts, the interface application 130 may apply additional processing to improve likelihood that the LLM 140 correctly answers the natural language prompt 112.

At block 404, the method 400 includes generating a series of contextual sub-questions based on the original natural language prompt using the large language model. For example, in an aspect, apparatus 300, processor 302, memory 304, interface application 130, and/or, and/or sub-question generator 134 may be configured to or may comprise means for generating a series of contextual sub-questions based on the original natural language prompt using the large language model. For example, the generating at block 404 may include generating the sub-questions based on the taxonomical dictionary 132. For instance, the taxonomical dictionary 132 may provide a chain of taxonomical keywords. The sub-question generator 134 may generate sub-questions based on the chain of taxonomical keywords until reaching a terminal state. Examples of generating sub-questions are described below in FIGS. 5 and 6. Further, for example, the generating at block 404 may be performed to resolve ambiguities in the natural language prompt by asking the LLM 140 to analyze the context of the natural language prompt 112.

At block 406, the method 400 includes providing the contextual sub-questions to the large language model to obtain contextual answers. For example, in an aspect, apparatus 300, processor 302, memory 304, interface application 130, and/or providing component 330 may be configured to or may comprise means for providing the contextual sub-questions to the large language model to obtain contextual answers. For example, the providing at block 406 may include making a call to the API 350 of the LLM. In some implementations, the providing component 330 may insert the sub-question 142 into the API call as a prompt. Further, for example, the providing at block 406 may use the LLM 140 to analyze the context rather than attempting to analyze the context based on programmed rules. Accordingly, using the LLM 140 may have advantages such as incorporating the large corpus on which the LLM 140 is trained.

At block 408, the method 400 includes applying the contextual sub-questions against the original natural language prompt with the contextual answers as a refined natural language prompt to the large language model in a reverse order of the series. For example, in an aspect, apparatus 300, processor 302, memory 304, interface application 130, and/or refined prompt generator 136 may be configured to or may comprise means for applying the contextual sub-questions against the original natural language prompt with the contextual answers as a refined natural language prompt to the large language model in a reverse order of the series. Further details of the block 408 are described below with respect to FIG. 7. Further, for example, the applying at block 408 may be performed to add context to the natural language prompt 112 to improve the accuracy of the answer from the LLM 140.

At block 410, the method 400 includes outputting, to the user, a final answer from the large language model to a terminal state of the refined natural language prompt. For example, in an aspect, apparatus 300, processor 302, memory 304, interface application 130, and/or outputting component 340 may be configured to or may comprise means for outputting, to the user, a final answer from the large language model to a terminal state of the refined natural language prompt. For example, the outputting at block 410 may include displaying the final answer 148 on a user interface. In some implementations, the final answer 148 may be a recommendation. For instance, the final answer 148 may recommend an option based on a mathematical comparison of the options. In some implementations, the display may credit the LLM 140 with the answer. For instance, the user interface may insert a watermark to help detect uncredited use of the LLM 140 in academics.

Figure 5:
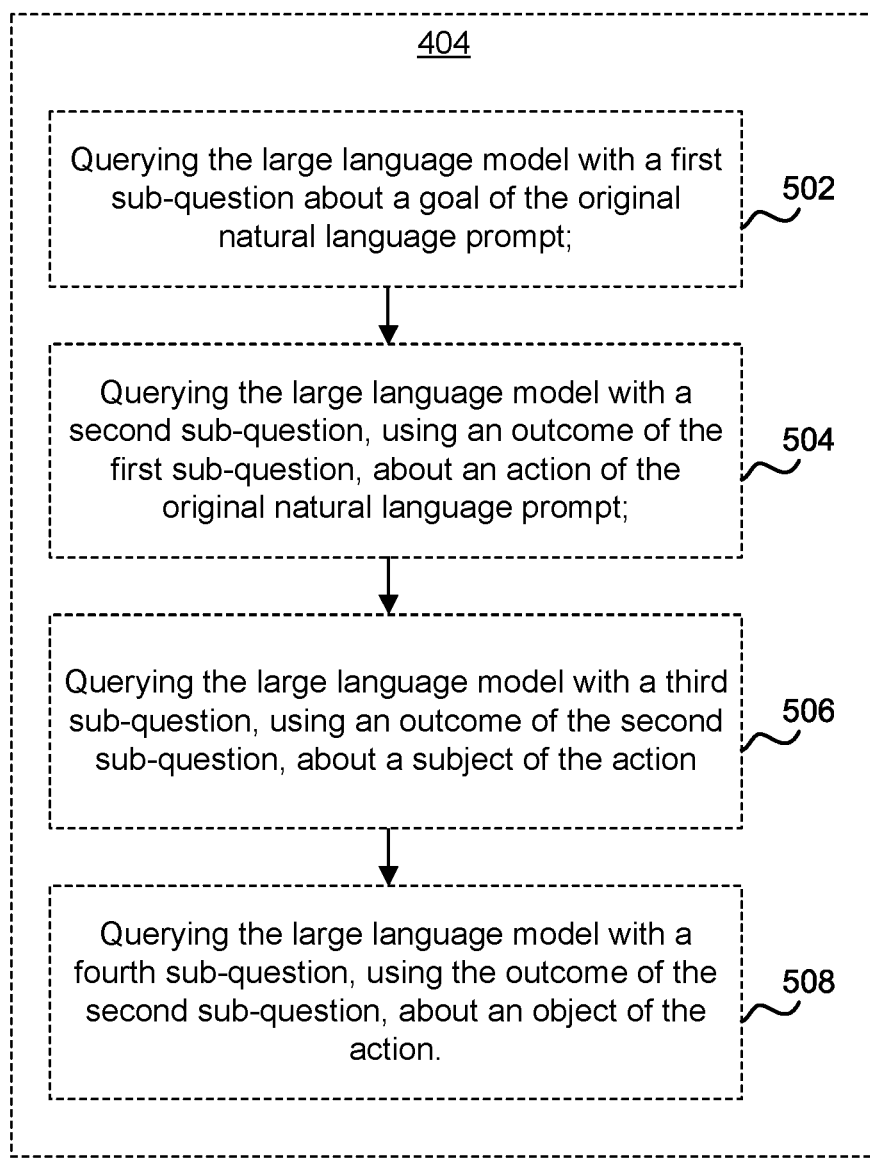
FIG. 5 is a flow diagram of a first example method of generating a series of contextual sub-questions based on the original natural language prompt using the large language model, in accordance with aspects described herein.

Referring to FIG. 5, in an alternative or additional aspect, at block 502, the generating at block 404 of the series of contextual sub-questions based on the original natural language prompt using the large language model comprises querying the large language model with a first sub-question about a goal of the original natural language prompt. For example, the sub-question generator 134 may add language such as "What is the goal of" at the beginning of the natural language prompt 112.

In this optional aspect, at block 504, the generating at block 404 of the series of contextual sub-questions based on the original natural language prompt using the large language model comprises querying the large language model with a second sub-question, using an outcome of the first sub-question, about an action of the original natural language prompt. For example, the sub-question generator 134 may add language such as "what is the action" to the contextual answer 144 from the first sub-question.

In this optional aspect, at block 506, the generating at block 404 of the series of contextual sub-questions based on the original natural language prompt using the large language model comprises querying the large language model with a third sub-question, using an outcome of the second sub-question, about a subject of the action. For example, the sub-question generator 134 may select a question based on the contextual answer 144 by looking up one or more words of the contextual answer in the taxonomical dictionary 132, which may include a chain of semantic keywords. For instance, an action such as "comparing" may indicate to ask what is being compared against. In general, the taxonomical dictionary 132 may include semantic keywords related to a subject of a verb.

In this optional aspect, at block 508, the generating at block 404 of the series of contextual sub-questions based on the original natural language prompt using the large language model comprises querying the large language model with a fourth sub-question, using the outcome of the second sub-question, about an object of the action. For example, once again, the sub-question generator 134 may look up one or more words of the contextual answer 144 to the second sub-question in the taxonomical dictionary 132. For transitive verbs, the taxonomical dictionary 132 may include semantic keywords related to an object of the transitive verb.

In an aspect, by explicitly asking the LLM 140 to analyze the goal, action, subject, and object of a natural language prompt, the interface application 130 may provide greater context to a math question, which may improve the accuracy of the LLM 140 in answering the math question. For instance, the added context may help identify relevant information in the natural language prompt 112 and prevent the LLM 140 from ignoring such information.

Figure 6:
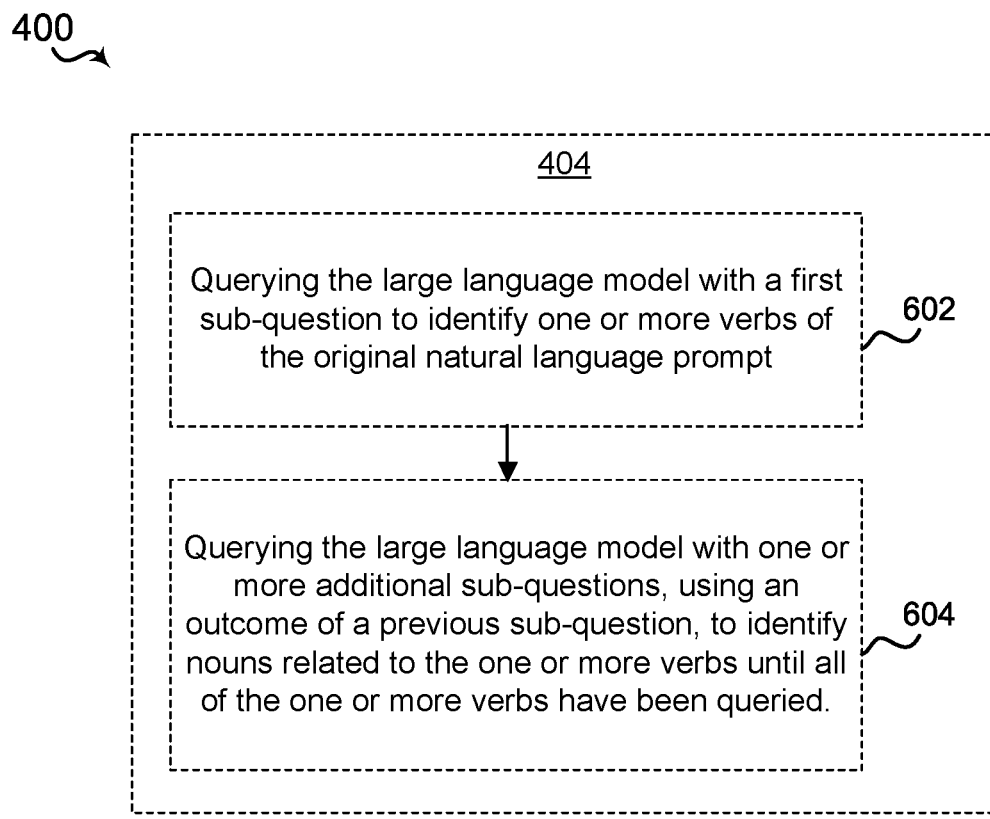
FIG. 6 is a flow diagram of a second example method of generating a series of contextual sub-questions based on the original natural language prompt using the large language model, in accordance with aspects described herein.

Referring to FIG. 6, in an alternative or additional aspect, at block 602, the generating at block 404 of the series of contextual sub-questions based on the original natural language prompt using the large language model comprises querying the large language model with a first sub-question to identify one or more verbs of the original natural language prompt. For example, the sub-question generator 134 may use the taxonomical dictionary to identify any semantic keywords related to any verbs identified in the natural language prompt 112.

In this optional aspect, at block 604, the generating at block 404 of the series of contextual sub-questions based on the original natural language prompt using the large language model comprises querying the large language model with one or more additional sub-questions, using an outcome of a previous sub-question, to identify nouns related to the one or more verbs until all of the one or more verbs have been queried. For instance, the taxonomical dictionary 132 may include chains of semantic keywords. By explicitly asking the LLM 140 to analyze the context of the verbs, potential ambiguities in the natural language prompt 112 may be resolved, for example, by identifying nouns in the natural language prompt 112 with a similar relationship to a verb.

Figure 7:
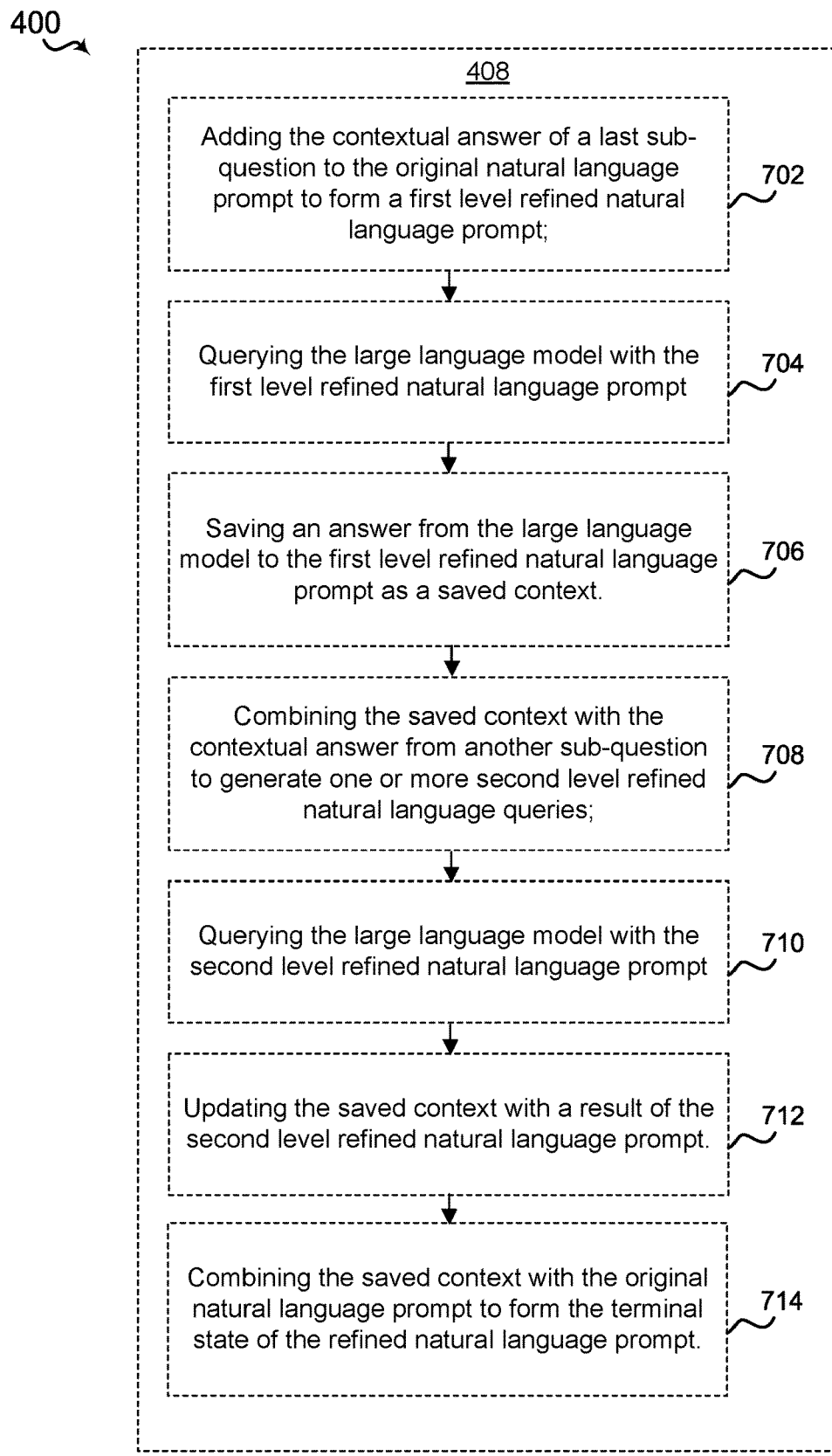
FIG. 7 is a flow diagram of an example method of applying the contextual sub-questions against the original natural language prompt with the contextual answers as a refined natural language prompt to the large language model in a reverse order of the series, in accordance with aspects described herein.

Referring to FIG. 7, in an alternative or additional aspect, at block 702, the applying at block 408 of the contextual sub-questions against the original natural language prompt with the contextual answers as a refined natural language prompt to the large language model in the reverse order of the series comprises adding the contextual answer 144 of a last sub-question 142 to the original natural language prompt 112 to form a first level refined natural language prompt 146.

In this optional aspect, at block 704, the applying at block 408 of the contextual sub-questions against the original natural language prompt with the contextual answers as a refined natural language prompt to the large language model in the reverse order of the series comprises querying the large language model 140 with the first level refined natural language prompt (e.g., updated question 224).

In this optional aspect, at block 706, the applying at block 408 of the contextual sub-questions against the original natural language prompt with the contextual answers as a refined natural language prompt to the large language model in the reverse order of the series comprises saving an answer from the large language model to the first level refined natural language prompt as a saved context 138.

In this optional aspect, at block 708, the applying at block 408 of the contextual sub-questions against the original natural language prompt with the contextual answers as a refined natural language prompt to the large language model in the reverse order of the series further includes combining the saved context with the contextual answer 144 from another sub-question 142 to generate one or more second level refined natural language prompts (e.g., final updated question 226).

In this optional aspect, at block 710, the applying at block 408 of the contextual sub-questions against the original natural language prompt with the contextual answers as a refined natural language prompt to the large language model in the reverse order of the series further includes querying the large language model with the second level refined natural language prompt.

In this optional aspect, at block 712, the applying at block 408 of the contextual sub-questions against the original natural language prompt with the contextual answers as a refined natural language prompt to the large language model in the reverse order of the series further includes updating the saved context 138 with a result of the second level refined natural language prompt.

In an alternative or additional aspect, at block 714, the applying at block 408 of the contextual sub-questions against the original natural language prompt with the contextual answers as a refined natural language prompt to the large language model in the reverse order of the series comprises combining the saved context with the original natural language prompt to form the terminal state of the refined natural language prompt.

Figure 8:
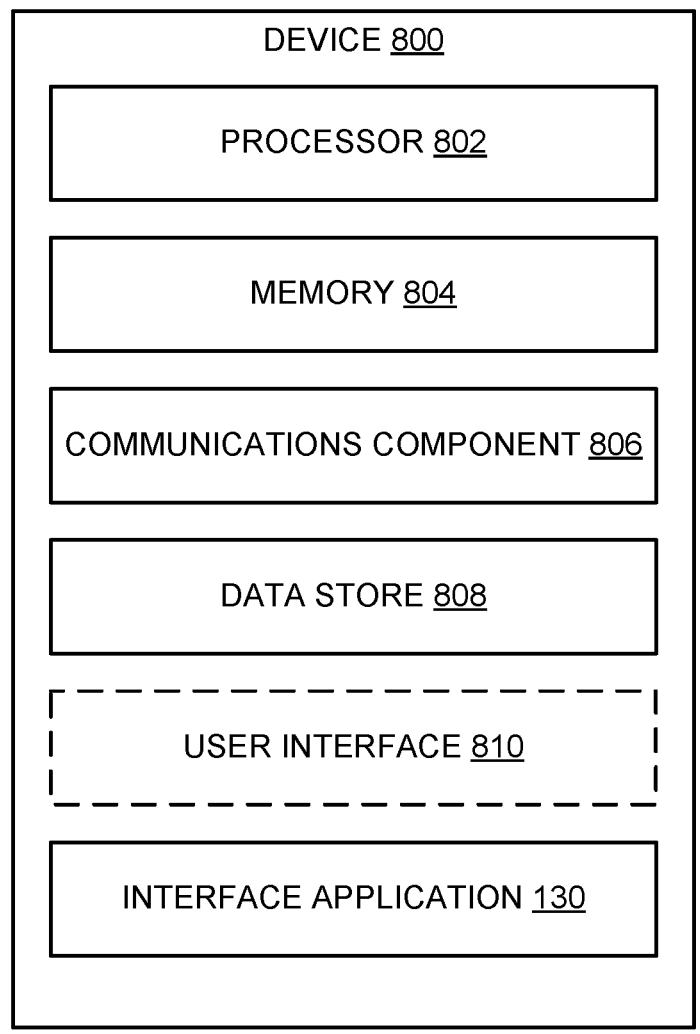
FIG. 8 is a schematic diagram of an example of a device for performing functions of refining a natural language question for a large language model, in accordance with aspects described herein.

FIG. 8 illustrates an example of a device 800 including additional optional component details as those shown in FIG. 3. In one aspect, device 800 includes processor 802, which may be similar to processor 802 for carrying out processing functions associated with one or more of components and functions described herein. Processor 802 can include a single or multiple set of processors or multi-core processors. Moreover, processor 802 can be implemented as an integrated processing system and/or a distributed processing system.

Device 800 further includes memory 804, which may be similar to memory 304 such as for storing local versions of operating systems (or components thereof) and/or applications being executed by processor 802, such as the interface application 130, sub-question generator 134, refined prompt generator 136, etc. Memory 804 can include a type of memory usable by a computer, such as random access memory (RAM), read only memory (ROM), tapes, magnetic discs, optical discs, volatile memory, non-volatile memory, and any combination thereof. The processor 802 may execute instructions stored on the memory 804 to cause the device 800 to perform the methods discussed above with respect to FIGS. 4-7.

Further, device 800 includes a communications component 806 that provides for establishing and maintaining communications with one or more other devices, parties, entities, etc. utilizing hardware, software, and services as described herein. Communications component 806 carries communications between components on device 800, as well as between device 800 and external devices, such as devices located across a communications network and/or devices serially or locally connected to device 800. For example, communications component 806 may include one or more buses, and may further include transmit chain components and receive chain components associated with a wireless or wired transmitter and receiver, respectively, operable for interfacing with external devices.

Additionally, device 800 may include a data store 808, which can be any suitable combination of hardware and/or software, that provides for mass storage of information, databases, and programs employed in connection with aspects described herein. For example, data store 808 may be or may include a data repository for operating systems (or components thereof), applications, related parameters, etc. not currently being executed by processor 802. In addition, data store 808 may be a data repository for the interface application 130.

Device 800 may optionally include a user interface component 810 operable to receive inputs from a user of device 800 and further operable to generate outputs for presentation to the user. User interface component 810 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

Device 800 additionally includes the interface application 130 for interfacing between a user and the LLM 140.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

Clause 1. A method of answering a natural language prompt using a large language model, comprising: receiving, at an interface between a user and a large language model, an original natural language prompt including a plurality of facts from the user; generating a series of contextual sub-questions based on the original natural language prompt using the large language model; providing the contextual sub-questions to the large language model to obtain contextual answers; applying the contextual sub-questions against the original natural language prompt with the contextual answers as a refined natural language prompt to the large language model in a reverse order of the series; and outputting, to the user, a final answer from the large language model to a terminal state of the refined natural language prompt.

Clause 2. The method of clause 1, further comprising determining based on semantic assessment using a taxonomical dictionary of the large language model that the original natural language prompt includes a question related to arithmetic reasoning.

Clause 3. The method of clause 2, wherein the original natural language prompt includes at least numerical values and an operation or comparison according to the taxonomical dictionary.

Clause 4. The method of clause 1, wherein generating the series of contextual sub-questions based on the original natural language prompt using the large language model comprises: querying the large language model with a first sub-question about a goal of the original natural language prompt; querying the large language model with a second sub-question, using an outcome of the first sub-question, about an action of the original natural language prompt; querying the large language model with a third sub-question, using an outcome of the second sub-question, about a subject of the action; and querying the large language model with a fourth sub-question, using the outcome of the second sub-question, about an object of the action.

Clause 5. The method of clause 1, wherein generating the series of contextual sub-questions based on the original natural language prompt using the large language model comprises: querying the large language model with a first sub-question to identify one or more verbs of the original natural language prompt; and querying the large language model with one or more additional sub-questions, using an outcome of a previous sub-question, to identify nouns related to the one or more verbs until all of the one or more verbs have been queried.

Clause 6. The method of clause 1, wherein applying the contextual sub-questions against the original natural language prompt with the contextual answers as a refined natural language prompt to the large language model in the reverse order of the series comprises: adding the contextual answer of a last sub-question to the original natural language prompt to form a first level refined natural language prompt; querying the large language model with the first level refined natural language prompt; and saving an answer from the large language model to the first level refined natural language prompt as a saved context.

Clause 7. The method of clause 6, wherein applying the contextual sub-questions against the original natural language prompt with the contextual answers as a refined natural language prompt to the large language model in the reverse order of the series further comprises: combining the saved context with the contextual answer from another sub-question to generate one or more second level refined natural language prompts; querying the large language model with the second level refined natural language prompt; and updating the saved context with a result of the second level refined natural language prompt.

Clause 8. The method of clause 6, wherein applying the contextual sub-questions against the original natural language prompt with the contextual answers as a refined natural language prompt to the large language model in the reverse order of the series comprises: combining the saved context with the original natural language prompt to form the terminal state of the refined natural language prompt.

Clause 9. An apparatus comprising: a memory; and a processor coupled with the memory and configured to: receive, at an interface between a user and a large language model, an original natural language prompt including a plurality of facts from the user; generate a series of contextual sub-questions based on the original natural language prompt using the large language model; provide the contextual sub-questions to the large language model to obtain contextual answers; apply the contextual sub-questions against the original natural language prompt with the contextual answers as a refined natural language prompt to the large language model in a reverse order of the series; and output, to the user, a final answer from the large language model to a terminal state of the refined natural language prompt.

Clause 10. The apparatus of clause 9, wherein the processor is further configured to determine based on semantic assessment using a taxonomical dictionary of the large language model that the original natural language prompt includes a question related to arithmetic reason.

Clause 11. The apparatus of clause 10, wherein the original natural language prompt includes at least numerical values and an operation or comparison according to the taxonomical dictionary.

Clause 12. The apparatus of clause 9, wherein to generate the series of contextual sub-questions based on the original natural language prompt using the large language model, the processor is further configured to: query the large language model with a first sub-question about a goal of the original natural language prompt; query the large language model with a second sub-question, using an outcome of the first sub-question, about an action of the original natural language prompt; query the large language model with a third sub-question, using an outcome of the second sub-question, about a subject of the action; and query the large language model with a fourth sub-question, using the outcome of the second sub-question, about an object of the action.

Clause 13. The apparatus of clause 9, wherein to generate the series of contextual sub-questions based on the original natural language prompt using the large language model, the processor is further configured to: query the large language model with a first sub-question to identify one or more verbs of the original natural language prompt; and query the large language model with one or more additional sub-questions, using an outcome of a previous sub-question, to identify nouns related to the one or more verbs until all of the one or more verbs have been queried.

Clause 14. The apparatus of clause 9, wherein to apply the contextual sub-questions against the original natural language prompt with the contextual answers as a refined natural language prompt to the large language model in the reverse order of the series, the processor is further configured to: add the contextual answer of a last sub-question to the original natural language prompt to form a first level refined natural language prompt; query the large language model with the first level refined natural language prompt; and save an answer from the large language model to the first level refined natural language prompt as a saved context.

Clause 15. The apparatus of clause 14, wherein to apply the contextual sub-questions against the original natural language prompt with the contextual answers as a refined natural language prompt to the large language model in the reverse order of the series, the processor is further configured to: combine the saved context with the contextual answer from another sub-question to generate one or more second level refined natural language queries; query the large language model with the second level refined natural language prompt; and update the saved context with a result of the second level refined natural language prompt.

Clause 16. The apparatus of clause 14, wherein to apply the contextual sub-questions against the original natural language prompt with the contextual answers as a refined natural language prompt to the large language model in the reverse order of the series, the processor is further configured to: combine the saved context with the original natural language prompt to form the terminal state of the refined natural language prompt.

Clause 17. A non-transitory computer-readable medium having computer-executable instructions stored thereon that when executed by a computer processor cause the computer processor to: receive, at an interface between a user and a large language model, an original natural language prompt including a plurality of facts from the user; generate a series of contextual sub-questions based on the original natural language prompt using the large language model; provide the contextual sub-questions to the large language model to obtain contextual answers; apply the contextual sub-questions against the original natural language prompt with the contextual answers as a refined natural language prompt to the large language model in a reverse order of the series; and output, to the user, a final answer from the large language model to a terminal state of the refined natural language prompt.

Clause 18. The non-transitory computer-readable medium of clause 17, further comprising instructions to determine based on semantic assessment using a taxonomical dictionary of the large language model that the original natural language prompt includes a question related to arithmetic reason.

Clause 19. The non-transitory computer-readable medium of clause 17, wherein the instructions to generate the series of contextual sub-questions based on the original natural language prompt using the large language model, comprise instructions to: query the large language model with a first sub-question about a goal of the original natural language prompt; query the large language model with a second sub-question, using an outcome of the first sub-question, about an action of the original natural language prompt; query the large language model with a third sub-question, using an outcome of the second sub-question, about a subject of the action; and query the large language model with a fourth sub-question, using the outcome of the second sub-question, about an object of the action.

Clause 20. The non-transitory computer-readable medium of clause 17, wherein the instructions to apply the contextual sub-questions against the original natural language prompt with the contextual answers as a refined natural language prompt to the large language model in the reverse order of the series comprise instructions to: add the contextual answer of a last sub-question to the original natural language prompt to form a first level refined natural language prompt; query the large language model with the first level refined natural language prompt; and save an answer from the large language model to the first level refined natural language prompt as a saved context.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of answering a natural language prompt using a large language model, comprising:
   receiving, at an interface between a user and a large language model, an original natural language prompt including a plurality of facts from the user;
   generating, at the interface, a series of contextual sub-questions based on the original natural language prompt using the large language model, wherein the generating comprises:
      querying the large language model with a first contextual sub-question about the natural language prompt; and
      querying the large language model with a second contextual sub-question that includes an outcome of the first sub-question;
   providing the contextual sub-questions to the large language model to obtain contextual answers;
   applying the contextual sub-questions against the original natural language prompt with the contextual answers as a refined natural language prompt to the large language model in a reverse order of the series, wherein applying the contextual sub-questions against the original natural language prompt with the contextual answers as a refined natural language prompt to the large language model in the reverse order of the series comprises:
      adding the contextual answer of a last sub-question to the original natural language prompt to form a first level refined natural language prompt;
      querying the large language model with the first level refined natural language prompt;
      saving an answer from the large language model to the first level refined natural language prompt as a saved context;
      combining the saved context with the contextual answer from another sub-question to generate one or more second level refined natural language prompts;
      querying the large language model with the second level refined natural language prompt; and
      updating the saved context with a result of the second level refined natural language prompt; and
   outputting, to the user, a final answer from the large language model to a terminal state of the refined natural language prompt.

2. The method of claim 1, wherein the final answer corresponds to a recommendation.

3. The method of claim 1, further comprising determining based on semantic assessment using a taxonomical dictionary of the large language model that the original natural language prompt includes a question related to arithmetic reasoning.

4. The method of claim 3, wherein the original natural language prompt includes at least numerical values and an operation or comparison according to the taxonomical dictionary.

5. The method of claim 1, wherein generating the series of contextual sub-questions based on the original natural language prompt using the large language model comprises:
   querying the large language model with a first sub-question about a goal of the original natural language prompt;
   querying the large language model with a second sub-question, using an outcome of the first sub-question, about an action of the original natural language prompt;
   querying the large language model with a third sub-question, using an outcome of the second sub-question, about a subject of the action; and
   querying the large language model with a fourth sub-question, using the outcome of the second sub-question, about an object of the action.

6. The method of claim 1, wherein generating the series of contextual sub-questions based on the original natural language prompt using the large language model comprises:

querying the large language model with a first sub-question to identify one or more verbs of the original natural language prompt; and querying the large language model with one or more additional sub-questions, using an outcome of a previous sub-question, to identify nouns related to the one or more verbs until all of the one or more verbs have been queried.

7. The method of claim 1, wherein applying the contextual sub-questions against the original natural language prompt with the contextual answers as a refined natural language prompt to the large language model in the reverse order of the series comprises:

combining the saved context with the original natural language prompt to form the terminal state of the refined natural language prompt.

8. An apparatus comprising:

a memory; and a processor coupled with the memory and configured to:
receive, at an interface between a user and a large language model, an original natural language prompt including a plurality of facts from the user;

generate a series of contextual sub-questions based on the original natural language prompt using the large language model, wherein to generate the series of contextual sub-questions based on the original natural language prompt using the large language model, the processor is further configured to:
query the large language model with a first contextual sub-question about the natural language prompt; and
query the large language model with a second contextual sub-question that includes an outcome of the first sub-question;

provide the contextual sub-questions to the large language model to obtain contextual answers;

apply the contextual sub-questions against the original natural language prompt with the contextual answers as a refined natural language prompt to the large language model in a reverse order of the series, wherein to apply the contextual sub-questions against the original natural language prompt with the contextual answers as a refined natural language prompt to the large language model in the reverse order of the series, the processor is further configured to:
add the contextual answer of a last sub-question to the original natural language prompt to form a first level refined natural language prompt;
query the large language model with the first level refined natural language prompt;
save an answer from the large language model to the first level refined natural language prompt as a saved context;
combine the saved context with the contextual answer from another sub-question to generate one or more second level refined natural language queries;
query the large language model with the second level refined natural language prompt; and
update the saved context with a result of the second level refined natural language prompt; and
output, to the user, a final answer from the large language model to a terminal state of the refined natural language prompt.

9. The apparatus of claim 8, wherein the processor is further configured to determine based on semantic assessment using a taxonomical dictionary of the large language model that the original natural language prompt includes a question related to arithmetic reasoning.

10. The apparatus of claim 9, wherein the original natural language prompt includes at least numerical values and an operation or comparison according to the taxonomical dictionary.

11. The apparatus of claim 8, wherein to generate the series of contextual sub-questions based on the original natural language prompt using the large language model, the processor is further configured to:
query the large language model with a first sub-question about a goal of the original natural language prompt;
query the large language model with a second sub-question, using an outcome of the first sub-question, about an action of the original natural language prompt;
query the large language model with a third sub-question, using an outcome of the second sub-question, about a subject of the action; and
query the large language model with a fourth sub-question, using the outcome of the second sub-question, about an object of the action.

12. The apparatus of claim 8, wherein to generate the series of contextual sub-questions based on the original natural language prompt using the large language model, the processor is further configured to:
query the large language model with a first sub-question to identify one or more verbs of the original natural language prompt; and
query the large language model with one or more additional sub-questions, using an outcome of a previous sub-question, to identify nouns related to the one or more verbs until all of the one or more verbs have been queried.

13. The apparatus of claim 8, wherein to apply the contextual sub-questions against the original natural language prompt with the contextual answers as a refined natural language prompt to the large language model in the reverse order of the series, the processor is further configured to:
combine the saved context with the original natural language prompt to form the terminal state of the refined natural language prompt.

14. A non-transitory computer-readable medium having computer-executable instructions stored thereon that when executed by a computer processor cause the computer processor to:
receive, at an interface between a user and a large language model, an original natural language prompt including a plurality of facts from the user;
generate a series of contextual sub-questions based on the original natural language prompt using the large language model, wherein the instructions to generate the series of contextual sub-questions comprise instructions to:
query the large language model with a first contextual sub-question about the natural language prompt; and
query the large language model with a second contextual sub-question that includes an outcome of the first sub-question;
provide the contextual sub-questions to the large language model to obtain contextual answers;
apply the contextual sub-questions against the original natural language prompt with the contextual answers as a refined natural language prompt to the large language model in a reverse order of the series, wherein the instructions to apply the contextual sub-questions against the original natural language prompt with the contextual answers as a refined natural language prompt to the large language model in the reverse order of the series comprise instructions to:
add the contextual answer of a last sub-question to the original natural language prompt to form a first level refined natural language prompt;
query the large language model with the first level refined natural language prompt;
save an answer from the large language model to the first level refined natural language prompt as a saved context;
combine the saved context with the contextual answer from another sub-question to generate one or more second level refined natural language queries;
query the large language model with the second level refined natural language prompt; and
update the saved context with a result of the second level refined natural language prompt; and
output, to the user, a final answer from the large language model to a terminal state of the refined natural language prompt.

15. The non-transitory computer-readable medium of claim 14, further comprising instructions to determine based on semantic assessment using a taxonomical dictionary of the large language model that the original natural language prompt includes a question related to arithmetic reason.

* * * * *